United States Patent [19]

Solomon et al.

[11] Patent Number: 5,058,941
[45] Date of Patent: Oct. 22, 1991

[54] VEHICLE INTERIOR BARRIER

[76] Inventors: Tony J. Solomon, 439 Frood Road, Suite 1, Sudbury, Ontario, Canada, P3C 4Z9; Eric W. Johnstone, 80 Edward Street, P.O. Box 540, Coniston, Ontario, Canada, P0M 1M0

[21] Appl. No.: 472,977

[22] Filed: Jan. 31, 1990

[51] Int. Cl.⁵ .............................. B60R 27/00
[52] U.S. Cl. ............................... 296/24.1
[58] Field of Search .................... 296/24.1, 85

[56] References Cited

U.S. PATENT DOCUMENTS

| | | | |
|---|---|---|---|
| 3,002,784 | 10/1961 | Bagg | 296/24.1 |
| 3,015,515 | 1/1962 | Halstead | 296/24.1 |
| 3,547,217 | 10/1969 | Garza | 296/24.1 |
| 3,549,195 | 12/1970 | Kallinikos | 296/24.1 |
| 4,035,014 | 7/1977 | Sellers | 296/24.1 |
| 4,411,465 | 10/1988 | Stuart, Jr. | 296/24.1 |

Primary Examiner—Robert R. Song
Attorney, Agent, or Firm—Trevor C. Klotz

[57] ABSTRACT

A barrier for partitioning the front and rear seat compartments in a motor vehicle is disclosed. The barrier includes a transparent wall dimensioned to approximate the cross-sectional area of the vehicle interior at a location behind the front seat. The wall has a pocket for printed matter in its lower half, and one or more light refracting channels can be located in the wall. A frame encloses one or more edges of the wall and includes an elongate channel section containing one or more electrical lights. The barrier can be installed, for example, in a taxi cab, and electricity supplied to illuminate printed matter placed in the pocket of the wall.

12 Claims, 2 Drawing Sheets

VEHICLE INTERIOR BARRIER

FIELD OF INVENTION

The present invention relates to a barrier used to partition the front and rear seat compartments of a motor vehicle such as a taxi cab. The barrier includes a transparent wall having a pocket adapted to receive printed matter, and having one or more light refracting channels which may be illuminated by electrical lamps located in a frame enclosing one or more edges of the wall.

BACKGROUND OF INVENTION

Where it is required to prevent access to the front seat compartment of a motor vehicle by someone located in the rear seat compartment, such as, for example, in a police car or taxi cab, it is known to partition the front and rear seat compartments by fixing at a location behind and above the front seat a rigid barrier dimensioned to approximate the cross-sectional area of the upper part of the vehicle interior. It is also known to select as the barrier material a rigid transparent plastic, such as Lexan *.
*Trade-Mark Barriers of the type previously described suffer from a number of disadvantages. Firstly, these barriers are often difficult and time consuming to install, as there is no ready connection for the barrier provided on the front seat of the vehicle. Secondly, barriers of this type provide only limited protection to front seat passengers, as the barrier does not prevent a rear seat passenger from penetrating the front seat back with a sharp object such as a knife. Thirdly, since these barriers extend only from the upper part of the adjacent seat back to the vehicle interior ceiling, there is not provided any space for the placement of advertising matter. Finally, these barriers are often unsightly, and may be susceptible to vandalism.

SUMMARY OF THE INVENTION

Unlike previous vehicle interior barriers, a device of the present invention provides a barrier for partitioning the front and rear seat compartments of a motor vehicle which overcomes the deficiencies of known barriers heretofore noted. There is disclosed herein a barrier which extends from the floor to the ceiling of the vehicle interior to provide enhanced protection to front seat passengers and which is easily and quickly installed. The barrier includes ample space for the placement of advertising matter, is aesthetically pleasing and is less susceptible to vandalism. The barrier can include removable advertising matter which cannot be accessed by rear seat passengers, and can include to illuminate the advertising matter a source of soft illumination which is also vandalism resistant.

Accordingly, the present invention relates to a barrier for partitioning the front and rear seat compartments in a motor vehicle. The barrier includes a transparent wall having respective front and rear faces, and which is dimensioned so as to approximate the cross-sectional area of the interior of the vehicle at a location between the front and rear seat compartments.

The lower half of the transparent wall includes a pocket, into which a sheet or board bearing advertising matter is removably insertable. The pocket may be of a simple flap type attached to a surface of the wall, for example the surface of the wall remote from the rear passenger compartment i.e. the front face. Alternatively, the wall itself may comprise a first sheet of transparent material dimensioned to approximate the cross-sectional area of the vehicle interior and a second sheet of transparent material dimensioned to correspond to the lower half of the first sheet. The second sheet overlies the lower part of the first sheet to form a pocket in the wall, between the first and second sheets.

The transparent wall advantageously includes light refracting means located therein, which may be comprised of one or more channels, which can be vertically disposed and spaced apart, and each of which can in turn be comprised of an aligned plurality of recesses in the wall.

The barrier includes a frame having an elongate channel section that receives edge portions of the wall. The channel section extends along at least one of the bottom and side edges of the wall, and disposed within the channel section are electrically responsive light emitting means, such as a plurality of light bulbs. The barrier also includes means for connecting the light emitting means to a source of electrical energy, and means for connecting the barrier to the interior of the vehicle.

The light refracting means, which as noted may comprise one or more vertically disposed channels located in the wall, is preferably located in the lower half of the wall.

As noted, the pocket may be formed by a second sheet of transparent material dimensioned to correspond to and overlap the lower half of a first sheet of transparent material dimensioned to approximate the cross-sectional area of the vehicle interior. The second sheet may be located on either the front seat compartment side or the rear seat compartment side of the first sheet. The light refracting means located in the wall may be located in either the first or the second sheet, and may be located in either side of the sheet selected.

By locating the second, smaller transparent sheet on the front seat side of the larger first transparent sheet to form a pocket therebetween, there is provided a barrier, which when connected to the vehicle interior and vehicle electrical supply, is a barrier including well-illuminated vandal-resistant removable advertising matter.

LIST OF DRAWINGS

The invention is illustrated by way of example in the following drawings, wherein.

Figure 4:
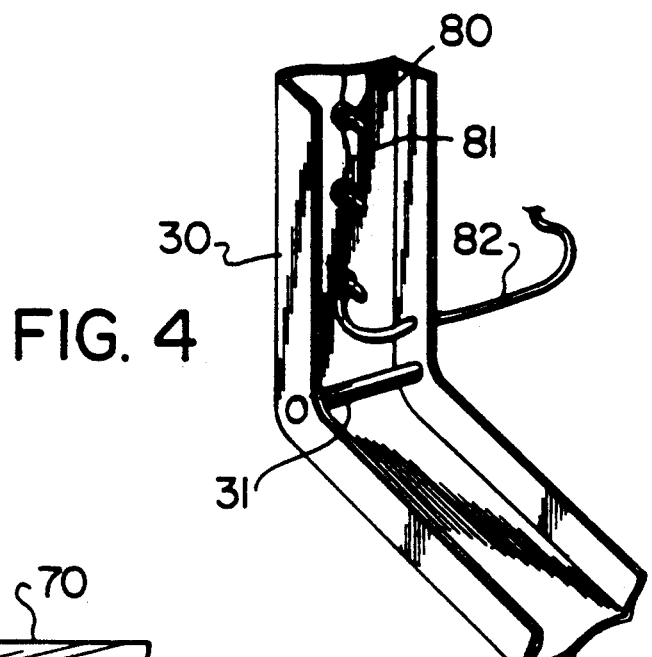
Figure 5:
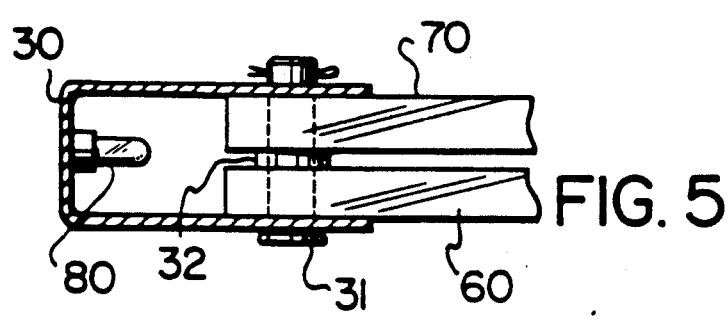

FIG. 4 is a partial oblique view of the frame illustrating the placement of the light emitting means within the channel section of the frame; and FIG. 5 is a cross-sectional view of an edge of the barrier illustrating the structural relationship between the first and second transparent sheets comprising the wall of the barrier, the frame of the barrier and the light emitting means located within the channel section of the frame.

DETAILED DESCRIPTION OF PREFERRED EMBODIMENTS

Figure 1:
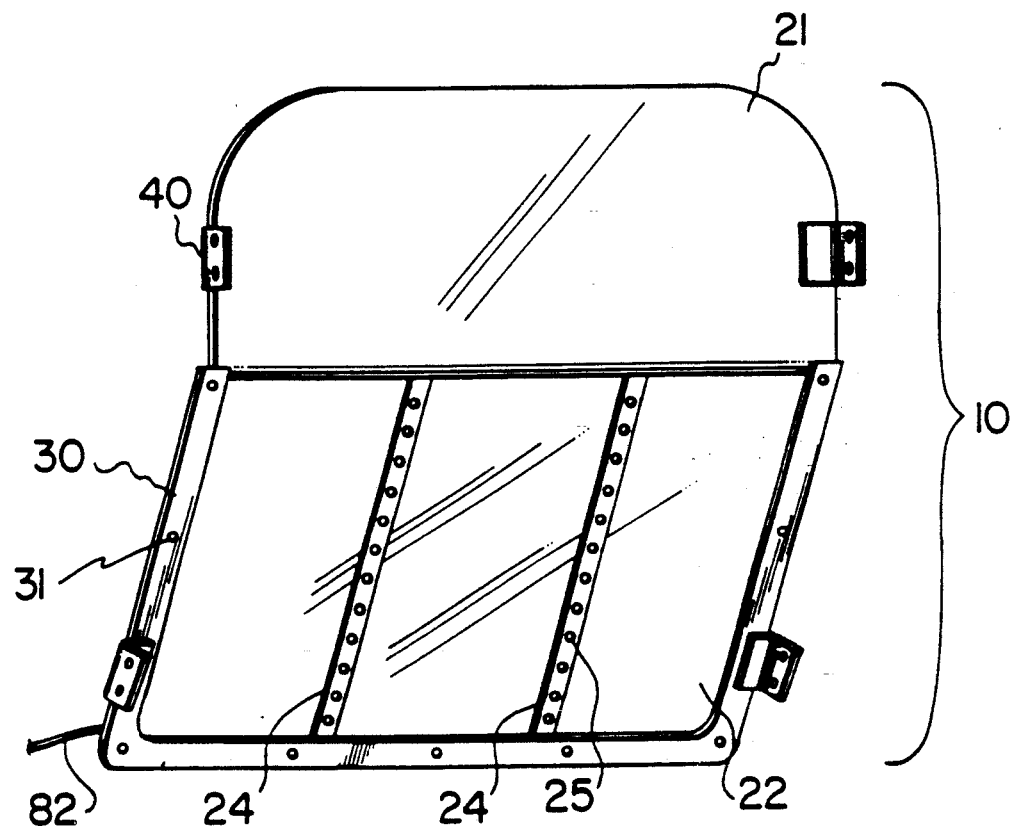
FIG. 1 is a rear oblique view provided in accordance with a barrier of the invention.

Referring to the drawings, illustrated in oblique view in FIG. 1 is a barrier 10 of the present invention. The barrier includes, a transparent wall configured to approximate the cross-sectional area of a motor vehicle interior at a location behind the front seat of the vehicle and has an upper wall section 21 and a lower wall section 22. Located in the rear face of lower wall section 22 are a plurality of circular recesses 25 arranged in a pair of spaced apart vertical rows illustrated in FIG. 1 by narrow bands designated 24. Extending along the bottom and side edges of the transparent wall, about lower wall section 22, is a U-shaped frame 30 enclosing the bottom and side edges of lower wall section 22. Frame 30 is secured to the transparent wall by a plurality of pins 31. Attached to and extending from each opposed side of frame 30 and upper wall section 21 are angle brackets 40. Each bracket 40 includes apertures so that barrier 10 may be bolted or otherwise secured to the vehicle interior.

Figure 2:
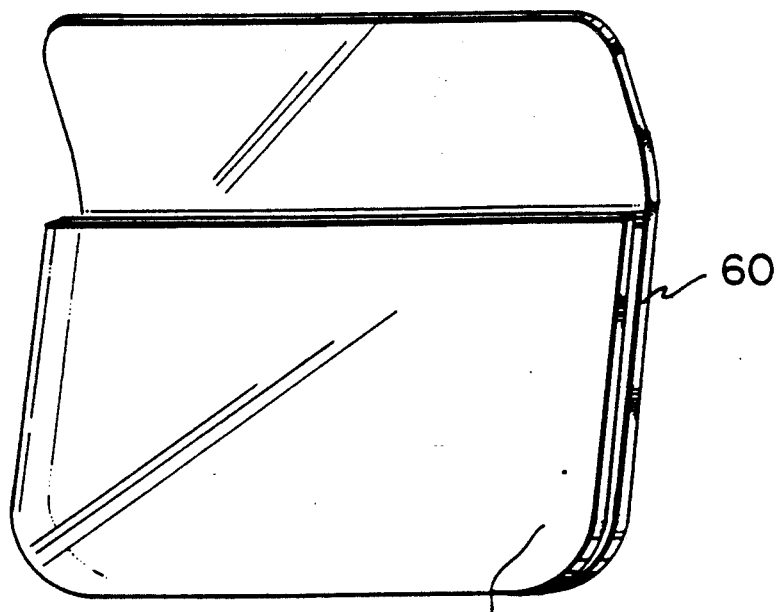
FIG. 2 is a front oblique view of the barrier with portions removed illustrating a wall having first and second transparent sheets of material.

Referring to FIG. 2 of the drawings, it will be seen that the transparent wall of the barrier is comprised of a first sheet 60 of transparent material dimensioned to approximate the cross-sectional area of the vehicle interior, and a second sheet 70 of transparent material dimensioned to correspond to and overlay the lower part of first sheet 60. Accordingly, in the embodiment described herein upper wall section 21 is comprised of the upper part of first sheet 60, while lower wall section 22 is comprised of second sheet 70 and the corresponding lower part of first sheet 60.

Figure 3:
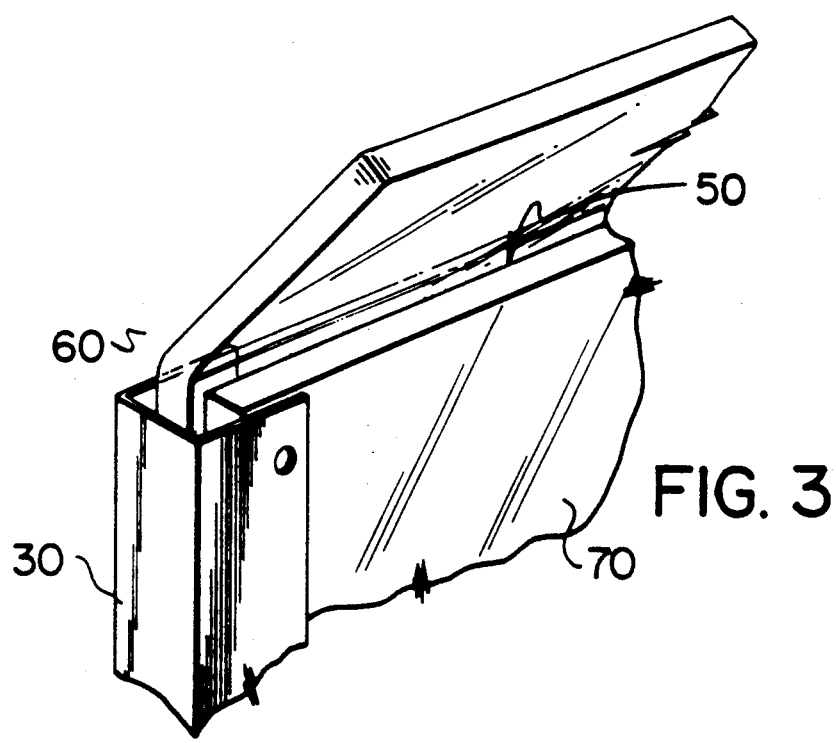
FIG. 3 is a perspective cutaway view of part of the barrier illustrating the pocket formed between the first and second transparent sheets of material.

The respective first and second sheets are arranged in close proximity to one another in spaced apart relationship, so as to form a pocket 50 between the sheets as illustrated in FIG. 3 of the drawings.

The first and second sheets can be maintained in spaced apart proximity to one another to form pocket 50 by the arrangement illustrated in FIG. 5 of the drawings. Referring to FIG. 5, there is illustrated in cross-sectional view first sheet 60 and second sheet 70 secured within U-shaped frame 30 by pin 31. Located on pin 31 between the sheets of transparent material is a spacer ring 32. The first and second sheets of transparent material are maintained in even spaced apart relationship by the spacer ring 32 located on each pin 31 used to secure frame 30 to the transparent wall.

Also illustrated in FIG. 5, in cross-sectional view, is frame 30 having a lamp 80 mounted therein inside of U-shaped frame 30. As seen in FIG. 4 there are a plurality of such lamps 80 mounted in spaced apart relationship inside of the U-shaped frame 30 and connected together by a connecting wire 81. Extending from connecting wire 81 and frame 30 is a power cable 82, which can be connected to the vehicle electrical system and through which electrical energy can be supplied to connecting wire 81 and lamps 80. Each lamp 80 is preferably of the long-life type, so as to minimize the frequency of lamp replacement.

In its assembled condition, a barrier 10 of the present invention may be installed in a motor vehicle interior by first positioning the unit adjacent the rear side of the front seat of the vehicle, and then securing the barrier to the motor vehicle by bolting the barrier to the vehicle at each bracket 40 of the barrier. It will be appreciated that various other means for connecting the barrier to the interior of the vehicle may be utilized, provided that the barrier is firmly secured to the body of the vehicle so that the barrier remains solidly in place.

With the barrier in place, printed matter such as advertising media may from the front seat compartment side be placed within the barrier by inserting same into pocket 50 between the first and second sheets comprising lower wall section 22 of the transparent wall. As well, lamps 80 and connecting wire 81 may be connected by cable 82 to a switched power source such as the vehicle electrical system.

With the advertising material located in pocket 50 and the barrier connected to the vehicle's electrical system, power may be supplied to the barrier lamps 80 to illuminate the lower wall section 22 of the transparent wall.

Light rays from the energized lamps 80 travel through and along the transparent lower wall section 22 of the barrier. The circular recess 25 located in the rear face of first transparent sheet 60, cause some of these rays of light to be refracted owing to the difference in density between the sheet material and surrounding environment present in the recess. As a result of having arranged the plurality of circular recesses 25 in vertical rows as illustrated in FIG. 1, the printed matter located within pocket 50 is illuminated in an aesthetically pleasing manner. In addition to the asthetic appeal, it is to be noted that the printed matter may not be readily defaced as it is located within pocket 50 behind first sheet 60, and pocket 50 is not accessible from the rear seat compartment of the vehicle.

Furthermore, it is to be noted that the means of illuminating the barrier comprising the plurality of lamps 80 is located inside U-shaped frame 30, with the result that the means of illuminating the barrier is resistent to tampering and vandalism by vehicle passengers.

It will be appreciated that the present invention is not limited to the features of the embodiments so described and illustrated, but includes all variations and modifications within the scope of the claims.

We claim:

1. A barrier for partitioning the front and rear seat compartments in a motor vehicle, comprising:
   (a) a transparent wall comprising a first sheet of transparent material dimensioned so as to approximate the cross-sectional area of the interior of the vehicle at a location between the two compartments, and a second sheet of transparent material dimensioned to correspond to the lower half of said first sheet, said second sheet overlying the corresponding part of said first sheet;
   (b) a substantially U-shaped frame of channel section extending along corresponding edges of said first and second sheets for holding said first and second sheets in spaced relationship;
   (c) said frame and said first and second sheets forming a pocket between said first and second sheets and which is accessible at the top of said second sheet; and
   (d) means for connecting said barrier to the interior of said vehicle.

2. The barrier as claimed in claim 1, wherein said barrier includes:
   (a) light refracting means in at least one of said second sheet and said lower half of said first sheet;
   (b) electrically responsive light emitting means disposed within and extending along said channel section; and (c) means for connecting said light emitting means to a source of electrical energy.

3. The barrier claimed in claim 2, wherein said pocket is adapted to receive printed matter.

4. The barrier as claimed in claim 3, wherein said light refracting means comprises a channel in the sheet which extends vertically therealong.

5. The barrier as claimed in claim 3, wherein said light refracting means comprises at least two spaced apart channels in the sheet which extend vertically therealong.

6. The barrier as claimed in claim 5, wherein said second sheet relative to said first sheet is adjacent said front seat compartment.

7. The barrier as claimed in claim 5, wherein said second sheet relative to said first sheet is adjacent said rear seat compartment.

8. The barrier as claimed in claim 6 or 7, wherein said channels are located in the second sheet interior of said pocket.

9. The barrier as claimed in claim 6 or 7, wherein said channels are located in the first sheet interior of said pocket.

10. The barrier claimed in claim 6, wherein said channels are located in the first sheet exterior of said pocket.

11. The barrier as claimed in claim 7, wherein said channels are located in the second sheet exterior of said pocket.

12. The barrier claimed in claim 2, wherein said light refracting means comprises one or more rows of circular recesses.

* * * * *